(12) United States Patent
Geller et al.

(10) Patent No.: US 7,055,990 B2
(45) Date of Patent: Jun. 6, 2006

(54) APPARATUS AND METHOD FOR PROVIDING SUBSTANTIALLY UNIFORM RADIATION OF A THREE-DIMENSIONAL OBJECT WITH AT LEAST ONE CURVED SURFACE

(75) Inventors: Boris Geller, Germantown, MD (US); Miodrag Cekic, Bethesda, MD (US); Jeffrey Okamitsu, Westminster, MD (US)

(73) Assignee: Fusion UV Systems, Inc., Gaithersburg, MD (US)

(*) Notice: Subject to any disclaimer, the term of this patent is extended or adjusted under 35 U.S.C. 154(b) by 191 days.

(21) Appl. No.: 10/839,332

(22) Filed: May 6, 2004

(65) Prior Publication Data

US 2005/0248946 A1 Nov. 10, 2005

(51) Int. Cl.
*F21V 7/00* (2006.01)
*A61N 5/06* (2006.01)

(52) U.S. Cl. ............... 362/297; 362/298; 362/346; 250/504 R

(58) Field of Classification Search ............ 362/97, 362/297–298, 346; 250/461.1, 504 R, 365
See application file for complete search history.

(56) References Cited

U.S. PATENT DOCUMENTS

| 3,983,039 | A | | 9/1976 | Eastland |
| 4,010,374 | A | | 3/1977 | Ramler |
| 4,103,175 | A | * | 7/1978 | Levin ................ 250/504 R |
| 4,250,390 | A | | 2/1981 | Nicholson |
| 4,276,479 | A | | 6/1981 | Mibu et al. |
| 4,348,015 | A | | 9/1982 | Domer |
| 4,456,948 | A | * | 6/1984 | Brun .................... 362/268 |
| 4,849,640 | A | | 7/1989 | Kruishoop |
| 4,990,788 | A | * | 2/1991 | Rabl et al. ............ 250/504 R |
| 5,097,136 | A | | 3/1992 | Meyer et al. |
| 5,932,886 | A | | 8/1999 | Arai et al. |
| 5,945,680 | A | | 8/1999 | Jensen |
| 6,238,066 | B1 | * | 5/2001 | Iwasaki ................ 362/347 |
| 6,333,509 | B1 | | 12/2001 | Lumpp |
| 6,649,921 | B1 | * | 11/2003 | Cekic et al. ........... 250/504 R |
| 6,967,342 | B1 | * | 11/2005 | Ruckman et al. ...... 250/504 R |
| 2003/0206339 | A1 | | 11/2003 | Boaz |

* cited by examiner

*Primary Examiner*—Ali Alavi
(74) *Attorney, Agent, or Firm*—Finnegan, Henderson, Farabow, Garrett & Dunner, LLP

(57) ABSTRACT

The invention is an apparatus and method for providing substantially uniform high peak irradiation of a three-dimensional object 12) with at least one curved surface (14). The apparatus includes a source of light (18) for providing light to irradiate the at least one curved surface of the three-dimensional object; a first curved light reflector (22) which reflects and converges light from the source into a first converged light beam (26); a second curved light reflector (24) which reflects and converges the first converged light beam into a second converged light beam (28) with the second light beam being redirected in direction relative to the first light beam toward a target area at which the three-dimensional object is positioned when being irradiated; and at least one light reflector (32, 34, 60) which extends from at least one of the first and second curved light reflectors which reflects and concentrates the second light beam toward the target area at which the three-dimensional object is positioned when being irradiated.

50 Claims, 13 Drawing Sheets

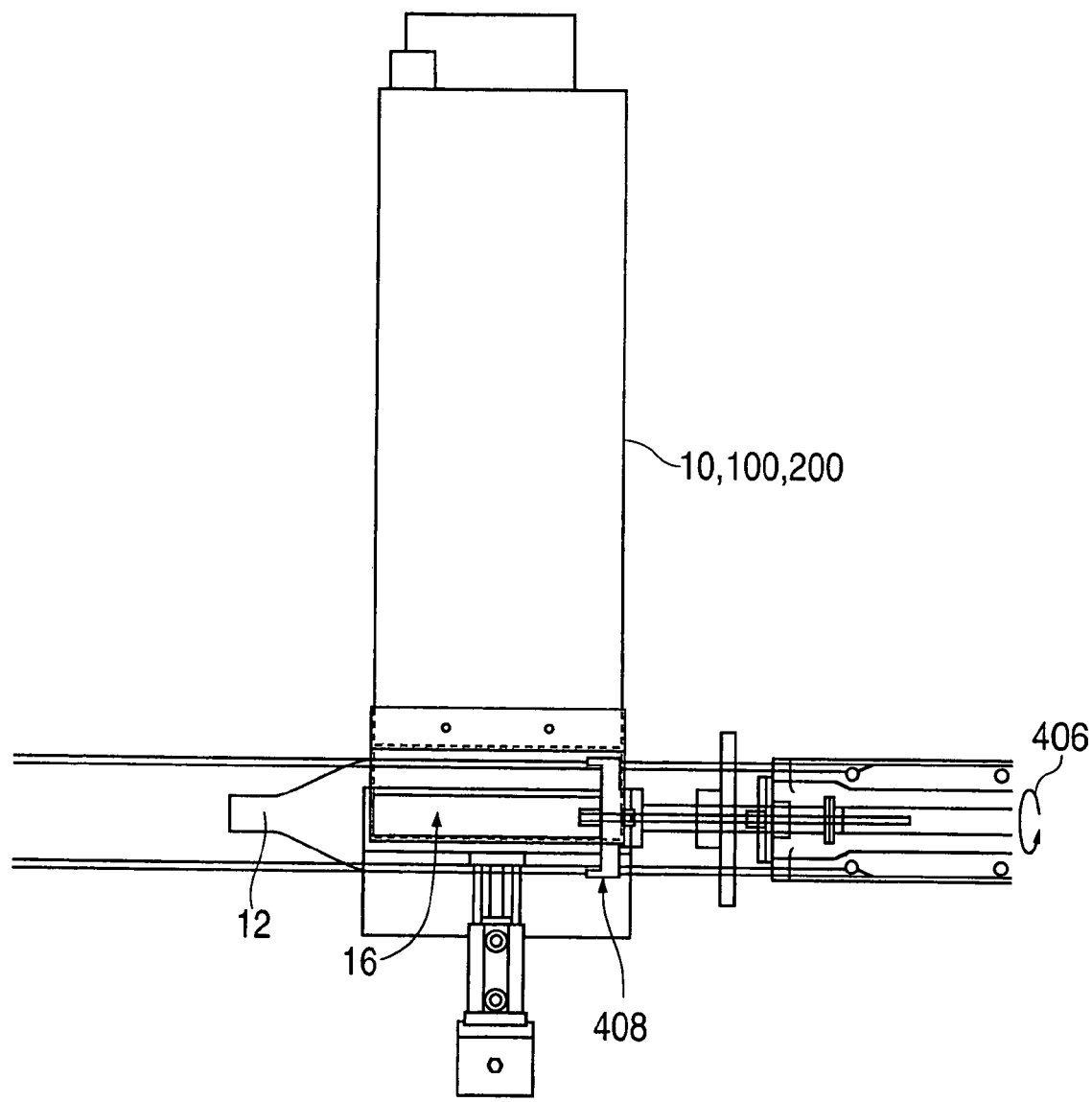

APPARATUS AND METHOD FOR PROVIDING SUBSTANTIALLY UNIFORM RADIATION OF A THREE-DIMENSIONAL OBJECT WITH AT LEAST ONE CURVED SURFACE

BACKGROUND OF THE INVENTION

1. Field of the Invention

The present invention relates to an apparatus and method for providing substantially uniform radiation of a three-dimensional object with at least one curved surface. More particularly, the present invention pertains to the aforementioned apparatus and method wherein a substantially uniform high level of peak irradiance is projected onto the at least one curved surface to efficiently treat the surface such as, for example, to perform Ultraviolet (UV) curing.

2. Description of the Prior Art

Various manufacturing processes include treating elongated curved object surfaces by irradiating the surfaces with, for example, UV or other radiation. The radiation treatment may be related to curing, purification, disinfection, advance oxidation or some other procedure. By way of example, in some printing processes, a printed pattern is cured by irradiating the pattern. Obtaining a high quality, uniform product requires irradiating a two-dimensional substantially uniform high level of radiation over the surface area of the at least one curved surface which has been coated with a coating requiring irradiating thereof. Otherwise irregularities in the finished product may result.

Existing devices for irradiating objects with radiation, such as UV expose a central area of an irradiated surface to more radiation than edge areas of the irradiated surface. The areas of high irradiation may receive more than the desired level, which can possibly cause damage, while the areas of low irradiation may be under treated.

Various techniques have been used to control the uniformity of irradiation of planar target surfaces as, for example, described in U.S. Pat. Nos. 4,010,374, 4,276,479 and 4,348,015.

United States Published Patent Application No. US 2003/0206399 A1, published Nov. 6, 2003, describes a reflector assembly for UV curing of curved objects such as glass bottles. UV light sources project light to reflectors, which redirect the ultraviolet light from parallel to the axes of the bottles to a direction perpendicular to the axes of the bottles. This permits UV to be applied to the surface of each of the glass bottles to insure that new printing is substantially completely cured. The light from the light source, which is funneled in a direction parallel to the longitudinal axes of the bottles and reflected orthogonally to the longitudinal axes to irradiate the bottles, can result in non-uniform distribution of irradiance on the bottles and non-uniform absorbance of energy thereon.

SUMMARY OF THE INVENTION

The present invention is an apparatus and method for providing substantially uniform irradiation of a three-dimensional object with at least one curved surface with a high level of peak irradiance. Furthermore, in a preferred application, the light source is UV and a conveying and rotating system, which may be of any design, transports three-dimensional objects with at least one curved surface to be treated with a substantially uniform high level of peak irradiance from a remote source, such as where printing with a light cured coating occurs, to a target area at which the three-dimensional objects may be rotated through a sufficient rotational angle so as to irradiate at least one curved surface. A high degree of optical coupling exists between the light source and the at least one curved surface.

A high degree of optical coupling from the source of light to the target area is achieved through a combination of a first curved light reflector which reflects and converges light from the light source into a first converged light beam; a second curved light reflector which reflects and converges the first converged light beam into a second converged light beam with the second light beam being redirected in a direction relative to the first light beam toward the target area at which the three-dimensional object is positioned when being irradiated and at least one light reflector which extends from at least one of the first and second curved light reflectors which reflects and concentrates the light beam toward the target area at which the three-dimensional object is positioned when being irradiated. Preferably two or three light reflectors are provided to perform the reflection and concentration of the second light beam toward the target area at which the three-dimensional object with at least one curved surface is positioned. The two or three light reflectors may be planar and/or curved reflectors with the point of attachment to the first and second curved reflectors being pivoted when two reflectors are used and the optional third reflector being pivoted to an end of one of the first and second light reflectors. The pivotable attachments of the first, second and optional third light reflectors permit the target area to be spatially defined relative to the at least one curved surface to be irradiated with substantially uniform high peak irradiance. This permits the accommodation of curved surfaces with different physical sizes. In a preferred application, the first and second curved light reflectors define a light reflective trough having a focal axis, which is substantially parallel to a focus of the first curved light reflector and displaced from the light source. An optimized form of the apparatus utilizes a portion of elliptical surfaces as the first and second curved light reflectors, which provides a highly efficient optical coupling from the light source to the target area.

The light source may be any light source but is preferably a source of UV such as a microwave electrodeless discharge bulb, an arc discharge bulb or a fluorescent discharge bulb.

Furthermore, in a preferred embodiment of the present invention, the positions of the light reflectors, which may be planar and/or curved, aid in optimizing the uniformity of the radiation distribution on the at least one curved surface and minimizes potentially detrimental effects of preexposure caused by the direct radiation from the light surface on the at least one surface.

The invention is an apparatus for providing substantially uniform irradiation of a three-dimensional object with at least one curved surface. The apparatus includes a source of light for providing light to irradiate the at least one curved surface of the three-dimensional object; a first curved light reflector which reflects and converges light from the source into a first converged light beam; a second curved light reflector which reflects and converges the first converged light beam into a second converged light beam with the second light beam being redirected in direction relative to the first light beam toward a target area at which the three-dimensional object is positioned when being irradiated; and at least one light reflector which extends from at least one of the first and second curved light reflectors which reflects and concentrates the second light beam toward the target area at which the three-dimensional object is positioned when being irradiated. Two light reflectors may extend respectively from the first and second curved light reflectors which reflect and concentrate the second beam with ends of the two light reflectors remote from an attachment to the first and second curved light reflectors being disposed so as to define an opening at the remote ends through which the light passes toward the target area. The two light reflectors may be respectively pivoted at the attachment to the first and second reflectors. The attachment of the two light reflectors to the first and second curved reflectors may be separated by a distance, which is greater than a distance separating the remote ends of the two light reflectors which define the opening to define a tapered reflective surface. The first and second curved light reflectors may define a light reflective trough; the first curved light reflector may be in cross section a portion of a surface having at least one focus with a locus of one of the at least one focus defining a focal axis in the reflective trough with the source of light being spaced from and substantially parallel to the focal axis so that the light is directed to the target surface with substantial uniformity; and the second curved light reflector may be in cross section a portion of a surface having at least one focus with the first curved light reflector being joined to the second curved light reflector. The first and second curved light reflectors may define a light reflective trough, which is closed by light reflective ends, and the two light reflectors are planar. The first and second curved light reflectors may be joined together to define a line of inflection between the first and second curved light reflectors so that tangents to the curvature of the first and second curved light reflectors adjacent to the line of inflection extend in different directions and a third reflective planar surface is pivotally joined to an end of one of the first and second light reflective surface which is remote from the attachment to the first and second curved light reflectors which further concentrates the second beam toward the target area. A conveying and rotating system may transport the three-dimensional object to the target area and rotate the object at the target area while light from the light source is directed to the target area; and wherein the light source may be a source of UV radiation. One of the first and second light reflectors may be curved and another of the first and second reflectors may be planar. The first and second light reflectors may be planar. The first and second curved light reflectors may be each a portion of an ellipse.

The invention is further a method for providing substantially uniform irradiation of a three-dimensional object with at least one curved surface with an apparatus including a source of light for providing light, a first curved light reflector which reflects and converges light, a second curved light reflector which reflects and converges light, and at least one light reflector which extends from at least one of the first and second curved light reflectors which reflects and concentrates light. The method includes the source of light irradiating the first curved light reflector with light; the first curved light reflector reflecting and converging the light from the source into a first converged light beam; the second curved light reflector reflecting and converging the first converged light beam into a second converged light beam with the second light beam being redirected in direction relative to the first light beam toward a target area at which the three-dimensional object is positioned when being irradiated; and the at least one light reflector reflects and concentrates the second light beam toward the target area at which the three-dimensional object is positioned when being irradiated. Two light reflectors may extend respectively from the first and second curved light reflectors which reflect and concentrate the second beam with ends of the two light reflectors remote from an attachment to the first and second curved light reflectors being disposed so as to define an opening at the remote ends through which the light passes toward the target area. The two light reflectors may be respectively pivoted at the attachment to the first and second reflectors. The first and second curved light reflectors may define a light reflective trough; the first curved light reflector may be in cross section a portion of a surface having at least one focus with a locus of one of the at least one focus defining a focal axis in the reflective trough with the source of light being spaced from and substantially parallel to the focal axis so that the light is directed to the target surface with substantial uniformity; and the second curved light reflector may be in cross section a portion of a surface having at least one focus with the first curved light reflector being joined to the second curved light reflector. The first and second curved light reflectors may define a light reflective trough, which is closed by light reflective ends, and the two light reflectors are planar. The first and second curved light reflectors may be joined together to define a line of inflection between the first and second curved light reflectors so that tangents to the curvature of the first and second curved light reflectors adjacent to the line of inflection extend in different directions and a third reflective planar surface is pivotally joined to an end of one of the first and second light reflective surface which is remote from the attachment to the first and second curved light reflectors which further concentrates the second beam toward the target area. A conveying and rotating system may transport the three-dimensional object to the target area and rotate the object at the target area while light from the light source is directed to the target area; and the light source may be a source of UV radiation. One of the first and second light reflectors may be curved and another of the first and second reflectors may be planar. The first and second light reflectors may be planar. The first and second curved light reflectors may be each a portion of an ellipse.

The invention also is a system for providing substantially uniform irradiation of a three-dimensional object with at least one curved surface. The system includes first and second spaced apart apparatus for providing substantially uniform radiation of the three-dimensional object with at least one curved surface which face the three-dimensional object from different positions; and wherein the first and second apparatus each comprise a source of light for providing light to irradiate the at least one curved surface of the three-dimensional object; a first curved light reflector which reflects and converges light from the source into a first converged light beam, a second curved light reflector which reflects and converges the first converged light beam into a second converged light beam with the second light beam being redirected in direction relative to the first light beam toward a target area at which the three-dimensional object is positioned when being irradiated, and at least one light reflector which extends from at least one of the first and second curved light reflectors which reflects and concentrates the second light beam toward the target area at which the three-dimensional object is positioned when being irradiated. The first and second apparatus may be opposed to and irradiate opposed portions of the at least one surface.

BRIEF DESCRIPTION OF THE DRAWINGS

FIG. 13 is an enlargement of an individual apparatus of the system of FIG. 12.

Like reference numerals identify like parts throughout the drawings.

DETAILED DESCRIPTION OF THE PREFERRED EMBODIMENTS

Figure 1:
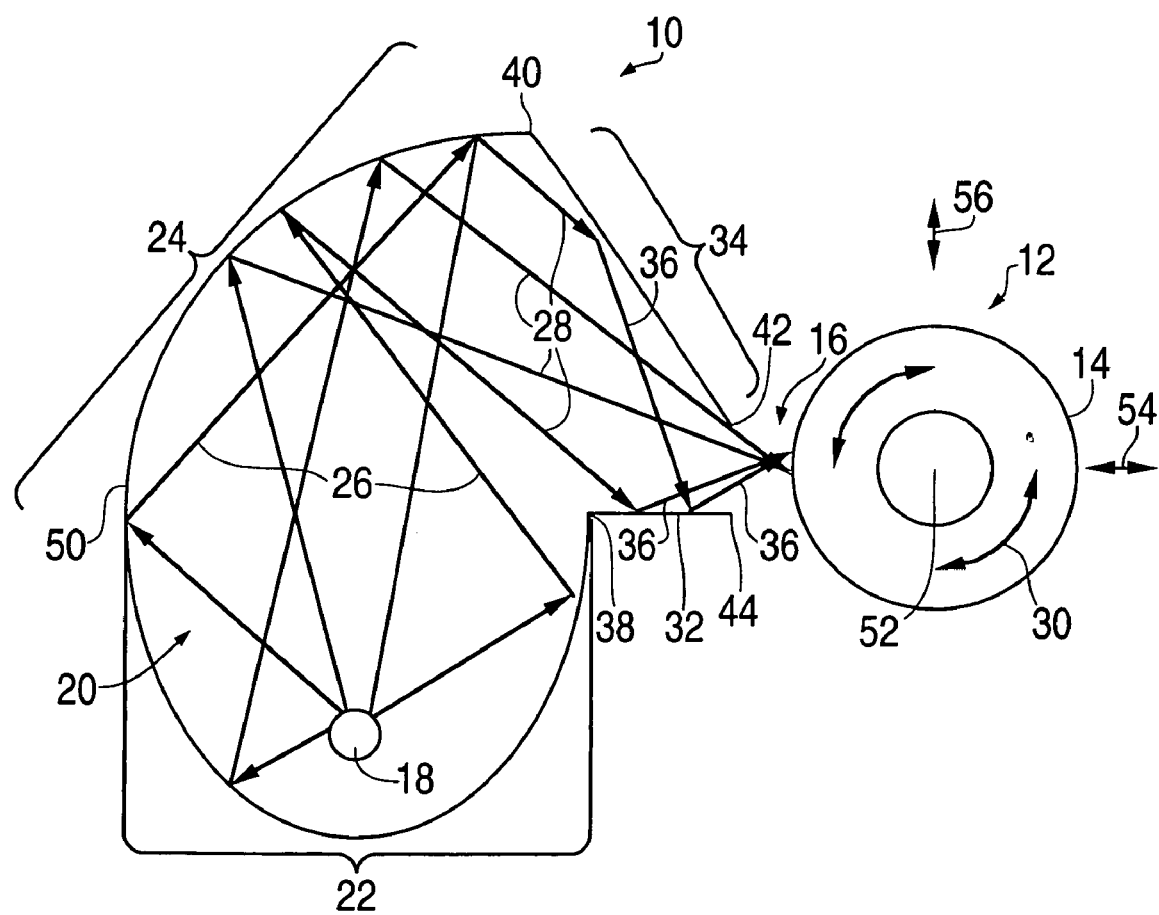
FIG. 1 is an end elevational view of a first embodiment of the present invention.
Figure 2:
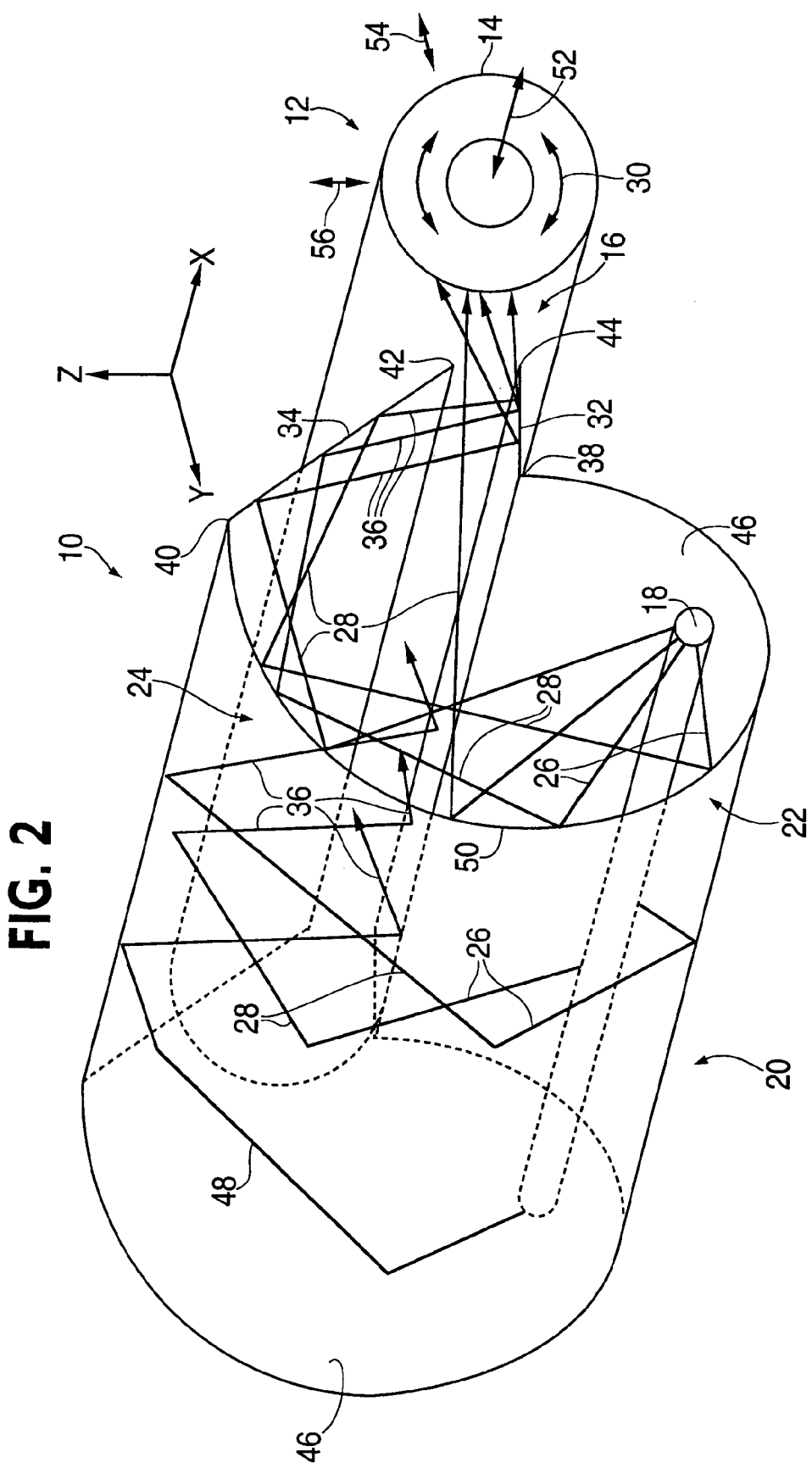
FIG. 2 is a perspective view of the first embodiment of the present invention.
Figure 3:
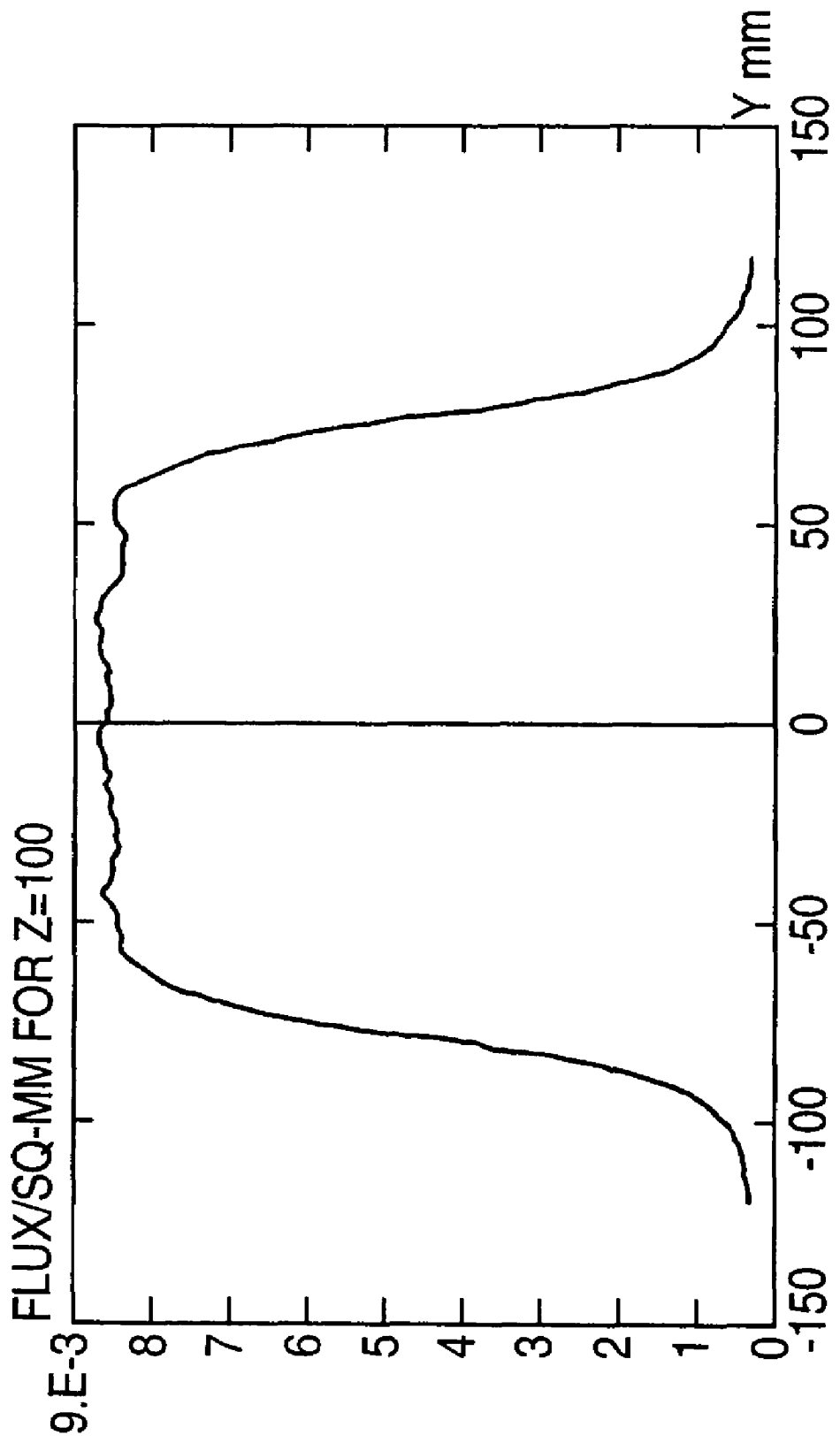
FIG. 3 is a ray-tracing model result illustrating the substantially uniform irradiation produced by the first embodiment along the Y axis in accordance with the present invention.
Figure 4:
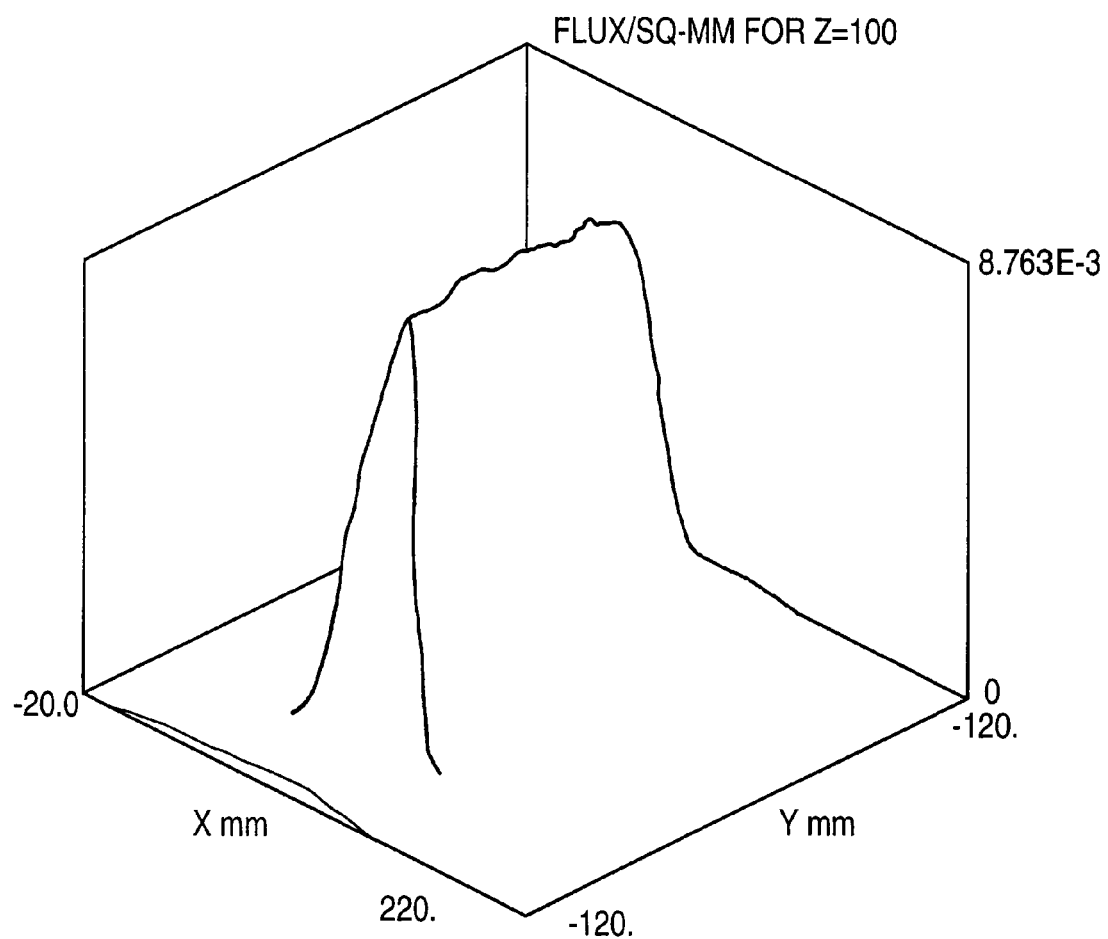
FIG. 4 is a ray-tracing model result illustrating substantially uniform irradiation produced by the first embodiment of the present invention along the X and Y axes.

FIGS. 1 and 2 illustrate a first embodiment 10 of the present invention and FIGS. 3 and 4 illustrate respectively ray-tracing model results of substantially uniform irradiation of a three-dimensional object 12 with at least one curved surface 14 along the Y axis and a computer simulation of substantially uniform irradiation along the X and Y axes in accordance with the first embodiment. The first embodiment 10 provides a substantially uniform high level of peak irradiation of a three-dimensional object 12, which has at least one curved surface 14, which as illustrated, is a cylinder. However, it should be understood that the invention is not limited to any number of or a shape of the at least one curved surface 14. The object 12 is rotated during illumination or curing of the at least one surface 14 located at a target area 16. A light source 18, which may be a source of visible light, but in a preferred application is a source of UV light of any known design, is located within light reflective trough 20. The light reflective trough 20 preferably contains at least one focal axis, which is spaced from the light source 18 to produce a desired degree of convergence of the reflected light. The surface of light reflective trough 20 is a continuous surface defined by a first curved light reflector 22 joined to a second curved light reflector 24.

The first curved light reflector 22 is in cross section any curve, which reflects and converges light from the light source 18 into a first converged light beam, which is indicated by arrows 26. The first curved reflector 22 preferably has at least one focus (not illustrated) defining a longitudinally extending focal axis in the reflective trough 20. The source of light 18 is spaced from and substantially parallel to the focal axis so that light is directed to the target surface with substantial uniformity and a high peak level of irradiance. Preferred shapes of the first curved light reflector 22 are circles, ellipses and parabolas, but curved surfaces without a focus may be used to reflect and converge the first light beam 26. The first converged beam is incident upon the second curved light reflector 24.

The second curved light reflector 24 is a curved surface of any shape, which converges the first, converged light beam into a second converged light beam represented by arrows 28. The second light beam is redirected, in a different direction relative to the first light beam, toward the target area 16 at which the three-dimensional object 12 is positioned when being irradiated. The three-dimensional object is preferably rotated as indicated by arrows 30. The redirection provided by the second curved reflective surface 24 prevents substantial direct irradiation of the three-dimensional object 12 which may result in detrimental premature exposure of the treated surface. The second curved light reflector 24 converges light of the first reflected and converged light beam 22 into the second reflected and converged light beam 28 and preferably, has at least one focus (not illustrated). Preferred shapes of the surface of the second curved light reflector 24 are circles, ellipses and parabolas, but curved surfaces without a focus may be used to reflect and converge the first light beam into the second converged light beam.

In a preferred embodiment of the present invention, the curve of the first and second curved light reflectors are portions of an ellipse which provides a highly efficient optical coupling between the light source 18 and the target area 16. Radiation from the light source 18 being directly incident upon the target area 16 may result in potentially detrimental premature exposure effects.

Preferably, at least one light reflector 32 and 34 extends from an end of at least one of the first and second curved light reflectors 22 and 24 to define a tapered reflective surface which reflects and concentrates the second light beam 28 towards the target area 16 as indicated by arrows 36 which reflect off of the at least one light reflector 32 and 34. The light reflectors 32 and 34 are pivoted respectively at pivot points 38 and 40 to provide variable tapering of the opening at remote ends thereof through which the light passes toward the target area 16 to provide substantially uniform high peak irradiation thereof. As illustrated, the attachment of the two light reflectors 32 and 34 to the first and second curved reflectors 22 and 24 is separated by a distance, which is greater than a distance separating the remote ends 42 and 44 of the two light reflectors. The difference between the distances defines the degree of tapering and the opening, which provides for concentration of the second beam 28.

FIG. 2 illustrates the trough 20 having light reflective ends 46 which close the trough at both ends. The ends 46 internally contain light from the light source 18, which is incident thereon as represented by light ray 48.

The first and second curved surfaces 22 and 24 are joined together as represented by reference numeral 50 to define a continuously curved interior reflective surface of the trough 20. The embodiment 10 preferably utilizes joined curved surfaces of elliptical cross section to define the trough 20 to optimize optical coupling of the light source 18 to the target area 16 to provide the substantially uniform high peak radiance of the at least one curved surface 14 of the object 12. The object 12 in a typical application is rotated, as represented by the arrows 30, to expose the at least one surface area 14 to the peak irradiance. The exposure may be chosen to be less than, a full 360° or a greater rotation.

The three-dimensional object 12 is illustrated as a cylinder such as, but not limited to, a bottle to be irradiated with UV to cure UV inks printed thereon previous to the positioning as illustrated in FIG. 2. A series of arrows 52, 54, and 56 illustrate the function performed by a conveying and rotating mechanism (not illustrated) of any design or combination of individual mechanisms for conveying the object 12 independently along one or more orthogonal axes or as a coordinated action by one system. An example of a conveying system is described below in conjunction with FIGS. 12 and 13, which transports the three-dimensional object to the target area 16 and rotates the object 12 while stopped at the target area at which light from the light source 18 is directed to the target area. Each of the arrows 52, 54 and 56 represent components of motion producing translation of the object 12 to be substantially uniformly irradiated at the target area 16 with a high level for peak irradiance. Not all components of motion 52, 54 or 56 are necessary with three orthogonal components being illustrated to suggest that the combination of any one or more conveying mechanisms producing components of motion in the directions indicated by the arrows may be utilized. Moreover, the rotational arrows 30 suggest rotary motion, which is the preferred operation of the present invention with a substantially uniform high level of peak irradiance, as represented by the graphs of FIGS. 3 and 4. Rotation of the three-dimensional object with at least one curved surface 14 through a substantial angle is used to expose the entire surface area with the high peak level of irradiance for curing or other light exposure applications. However, it should be noted that the present invention is not limited to applications in which the object is irradiated with curing radiation with the irradiation being also useful for other processing applications, such as purification, disinfection, oxidation or other procedures.

FIG. 3 illustrates a ray-tracing model irradiance results produced with the first embodiment 10 of the present invention along a Y axis and FIG. 4 illustrates a computer simulation of irradiance produced in accordance with the first embodiment of the present invention illustrating both X and Y axes. As may be seen from the graphs of FIGS. 3 and 4, the resultant irradiance is substantially uniform with a high peak over a surface of a three-dimensional object 12 with at least one curved surface 14. While only one curved surface 14 is illustrated, it should be understood that more than one regular or irregular curved surfaces may be irradiated.

Figure 5:
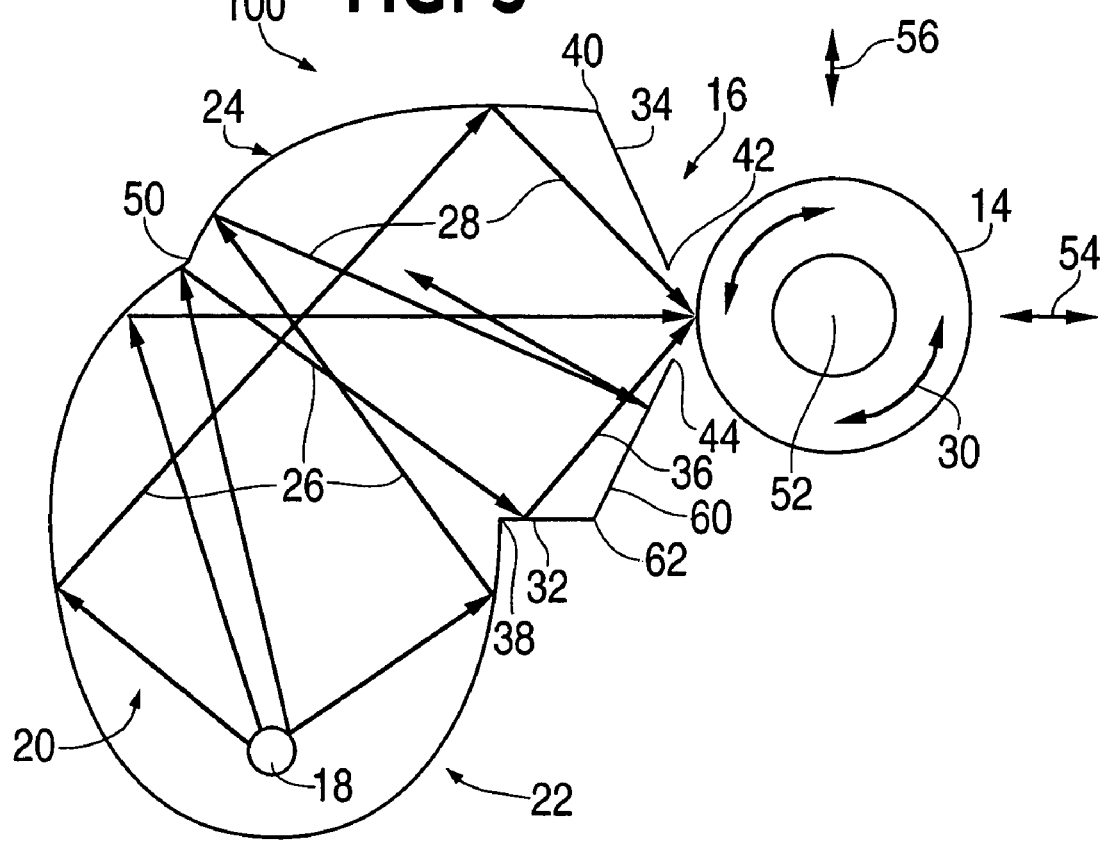
FIG. 5 is an end elevational view of the a second embodiment of the present invention.
Figure 6:
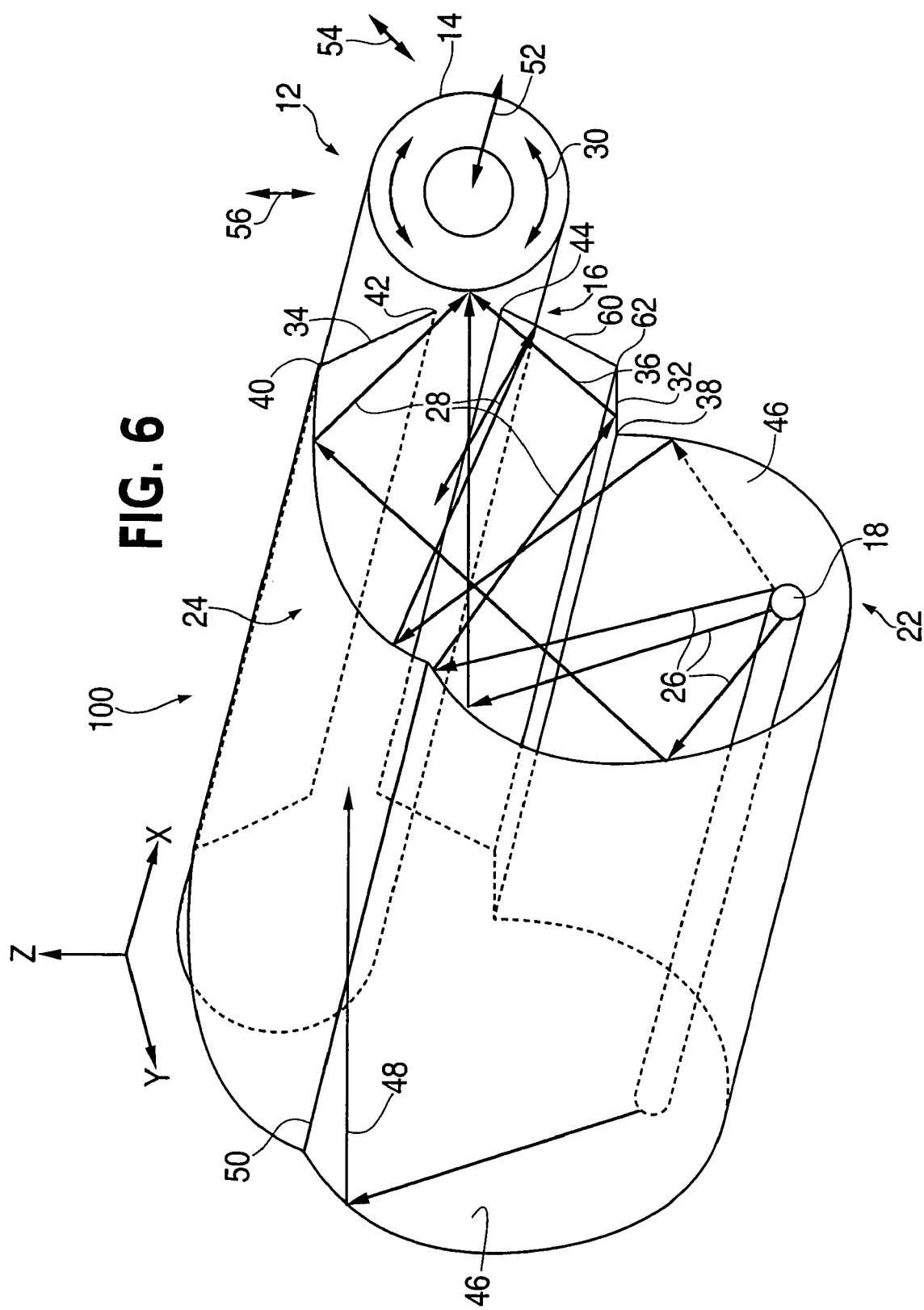
FIG. 6 is a perspective view of the second embodiment of the present invention.
Figure 7:
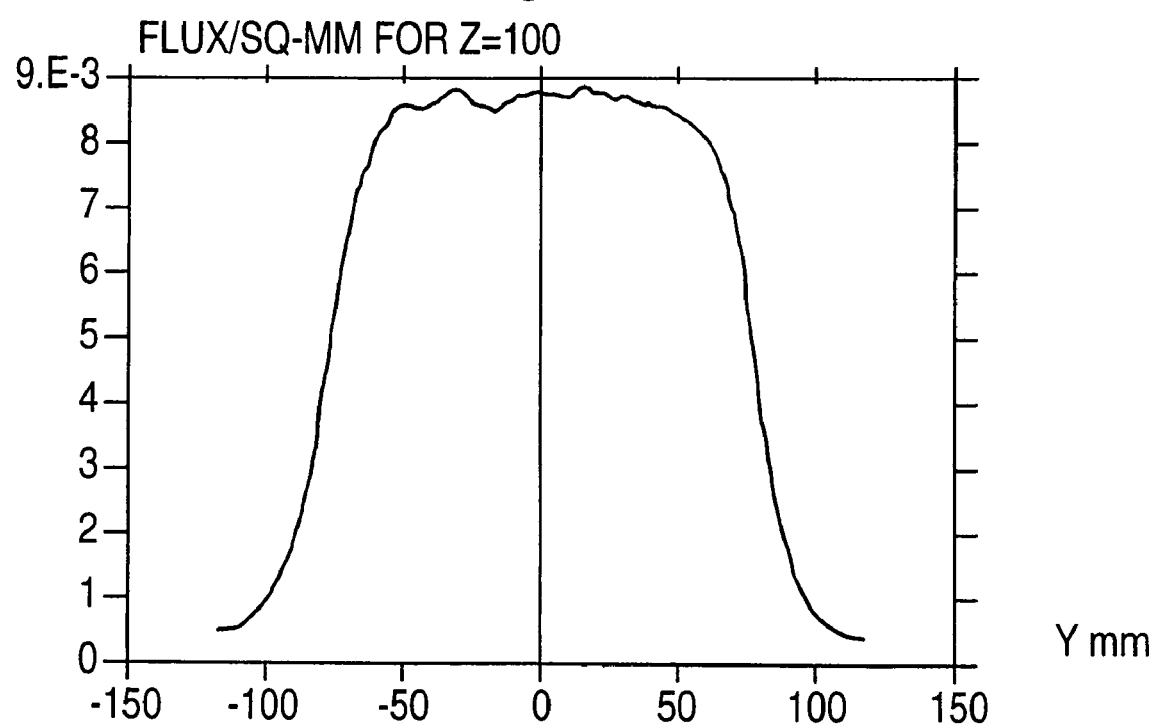
FIG. 7 is ray-tracing model result illustrating the substantially uniform irradiation produced by the second embodiment along the Y axis with the present invention.
Figure 8:
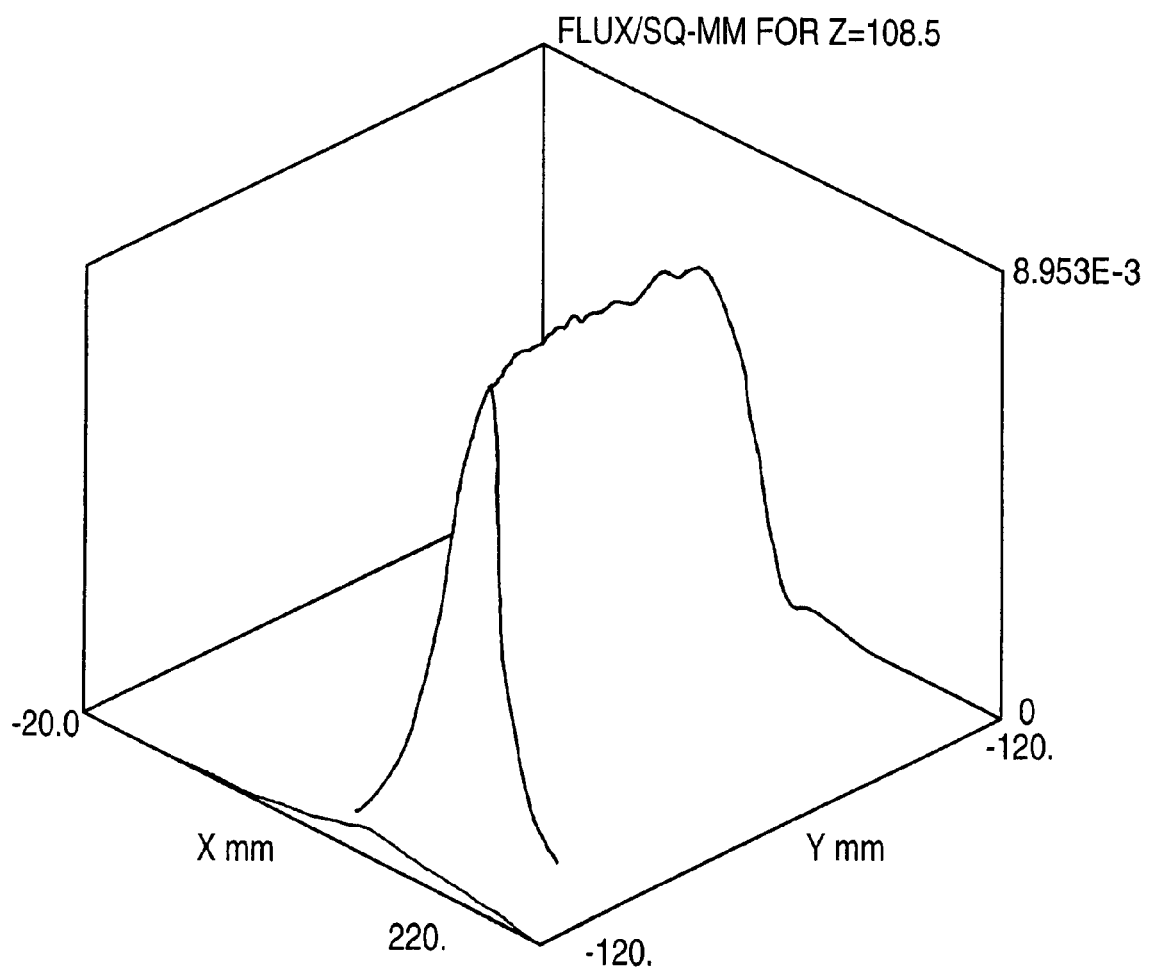
FIG. 8 is ray-tracing model result illustrating the substantially uniform irradiation produced by the second embodiment of the present invention along the X and Y axes.

FIG. 5 illustrates a second embodiment 100 of the present invention, which differs in two principal aspects from the first embodiment 10. The common aspects of the first and second embodiments 10 and 100 will not be discussed in association with the second embodiment 100 illustrated in FIGS. 5 and 6 with substantially uniform irradiance being illustrated in the graph of FIG. 7 along the Y axis and the substantially uniform irradiance along the X and Y axis being illustrated in FIG. 8. The two principal structural differences between the first embodiment 10 and the second embodiment 100 are that the first and second curved light reflectors 22 and 24 in the second embodiment both have elliptical cross section joined together to define a line of inflection 50 between the first and second curved light reflectors so that tangents to the cross-sectional ellipses of the first and second curve light reflectors adjacent to the line of inflection extend in different directions and, a third reflective planar surface 60 is pivotally joined to a remote end of the light reflector 32 at a pivot point 62 which is remote from the attachment 38 and 40 to the first and second light reflectors 32 and 34 which further concentrates the second beam 36 toward the target area 16. The reflectors with elliptical cross sections of the second embodiment allow for better optical coupling to the irradiated surface, at the expense of more demanding fabrication, alignment, and assembly procedures. The third reflective planar surface 60 permits a greater tapering of the reflective surfaces that concentrate the second beam than with only the reflective surfaces 32 and 34.

Figure 9:
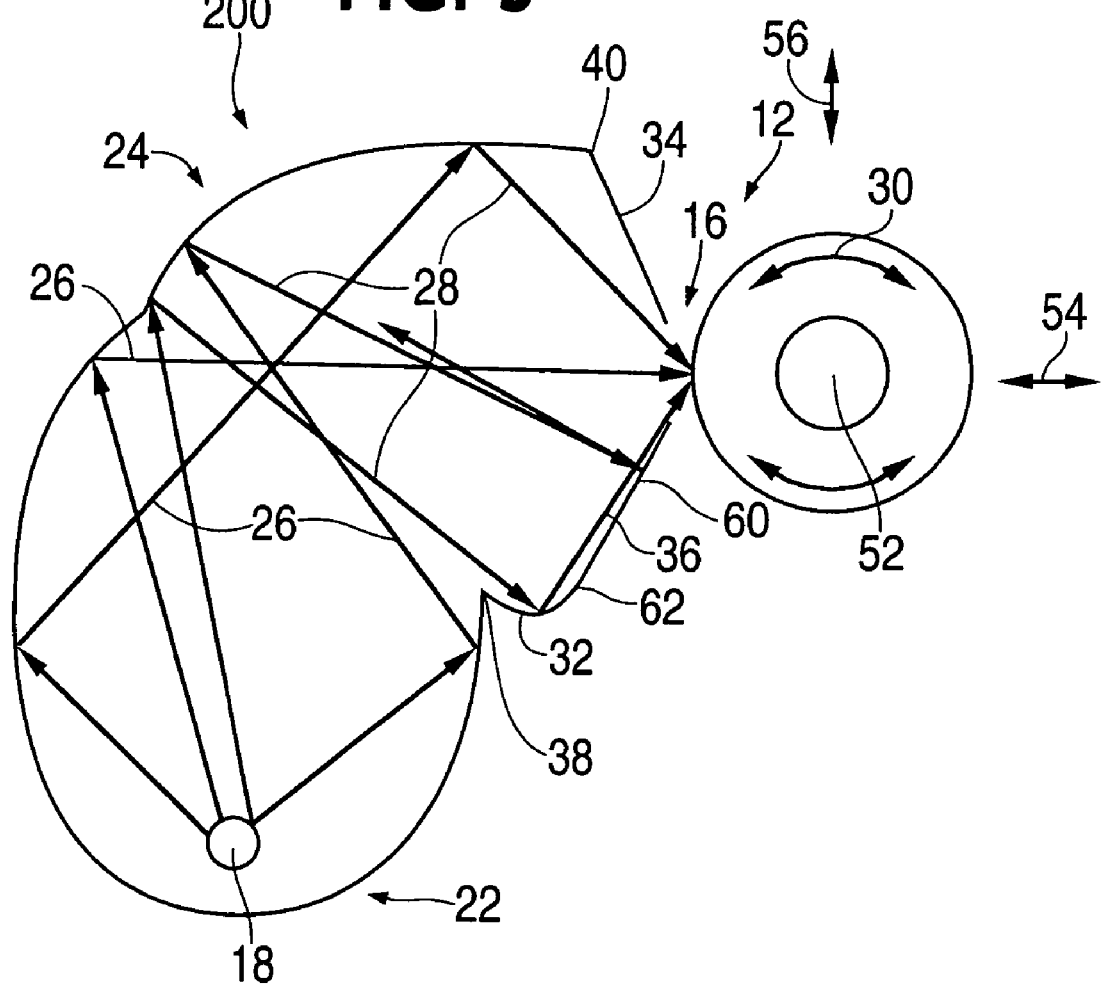
FIG. 9 is an elevational view of a third embodiment of the present invention.
Figure 10:
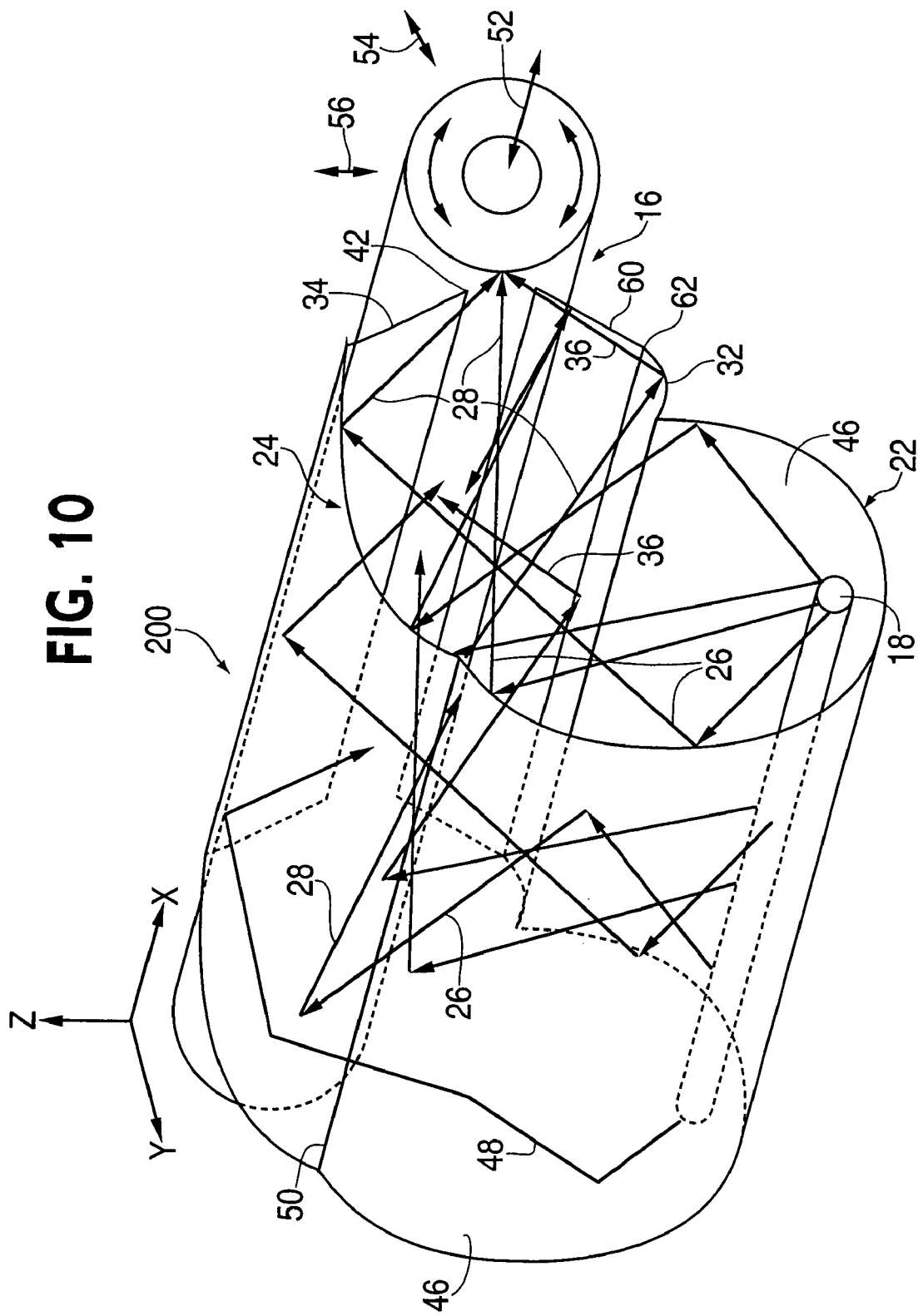
FIG. 10 is a perspective view of the third embodiment of the present invention.

FIGS. 9 and 10 illustrate a third embodiment 200 of the present invention, which differs from the second embodiment 100 principally in that the reflective surface 32 is concavely curved inward. The curved reflective surface 32 is preferably part of the same elliptical cross section, which also includes the cross section of the second curved reflective surface 24. The inclusion of the cross section of the curved reflective surface 32 within the cross-sectional ellipse also containing the cross section of the second curved reflective surface 24 further enhances converging of the second light beam.

Figure 11:
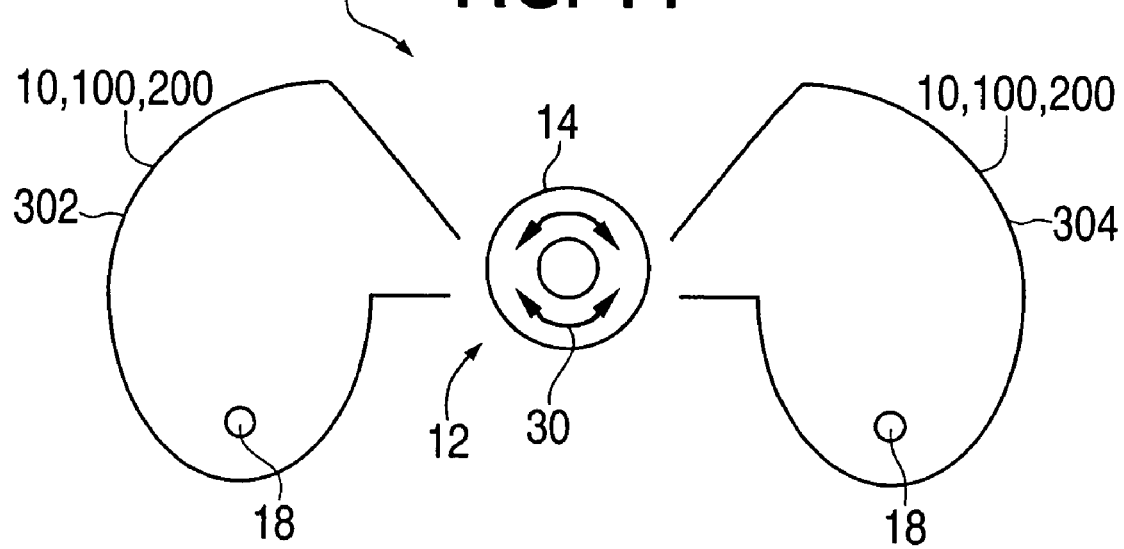
FIG. 11 is a view of a system for providing substantially uniform irradiation of a three-dimensional object with at least one curved surface in accordance with the invention which includes spaced apart apparatus which irradiate and face different parts of the at least one surface each in accordance with the first, second or third embodiments of the present invention.

FIG. 11 illustrates a system 300 for providing substantially uniform irradiation of a three-dimensional object 12 with at least one curved surface 14. The system 300 is comprised of first and second spaced apart apparatus 302 and 304, which represent any of the three embodiments 10, 100 or 200 described above, but which have not been illustrated with the detail thereof. The first and second apparatus are diametrically opposed to and irradiate opposed portions of the at least one surface 14 of the three-dimensional object 12.

Figure 12:
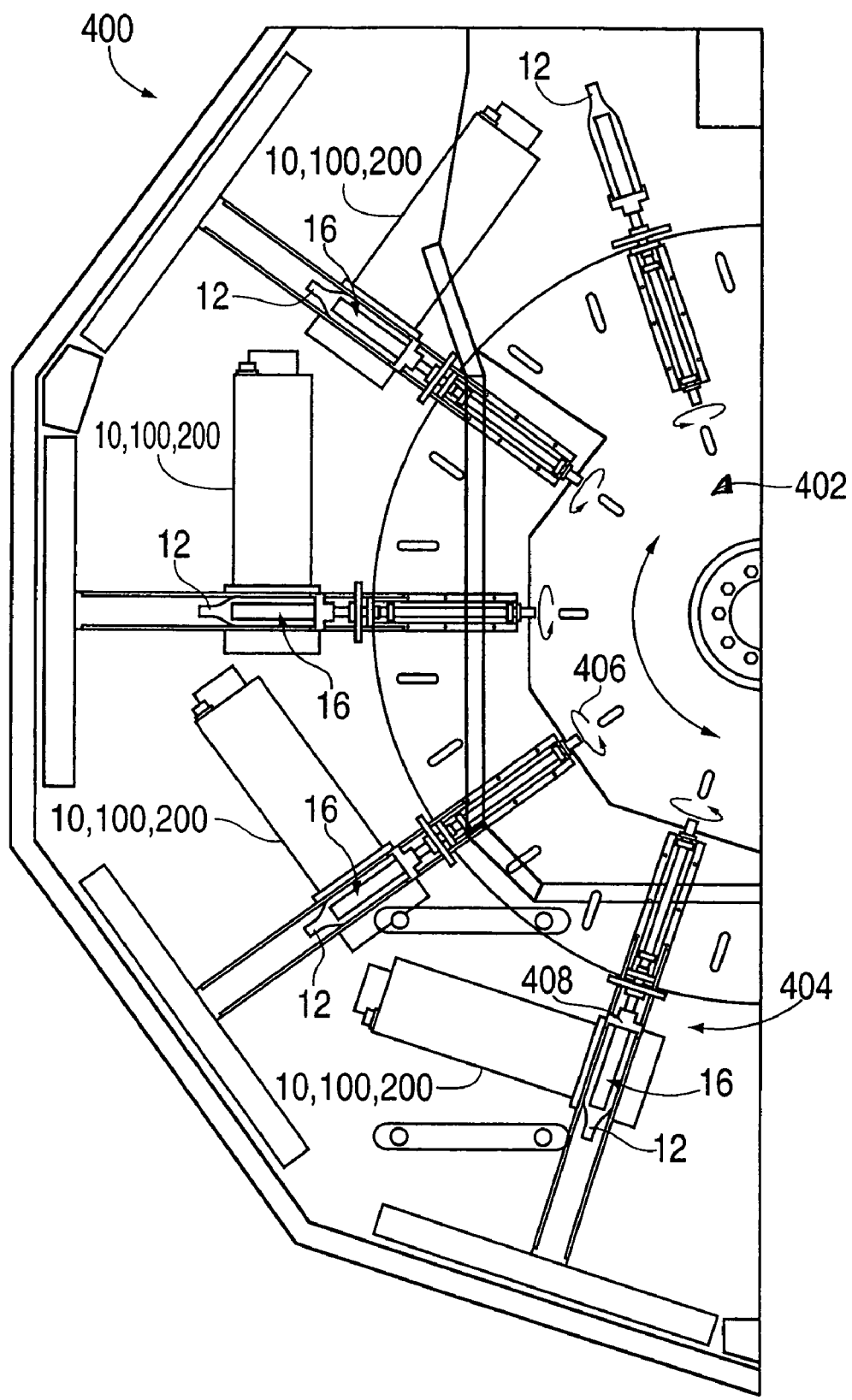
FIG. 12 is a top view of a system for providing substantially uniform irradiation of three-dimensional objects which includes a conveying and rotating system for transporting three-dimensional objects to the target area of multiple spaced apart individual apparatus for providing substantially uniform irradiation of each three-dimensional object with the first, second or third embodiments of the present invention.

FIG. 12 illustrates an example of a conveying and rotating system 400 which was developed by The Tecno 5 Corporation (Via Micheli 7, S. Polo di Torrile, Italy) which is an example of one of many possible designs for transporting the three-dimensional object 12 to the target area 16 and rotating the object at the target area while the light from the light source 18 is directed thereto. As illustrated, a series of apparatus 10, 100 or 200 for providing substantially uniform irradiation of three-dimensional objects with at least one curved surface 14 are circumferentially located relative to a turntable 402 at which, in the right-hand portion (not illustrated) individual objects, such as bottles 12, are printed with a UV curable ink and then held by a holding and rotating mechanism 404 which is described in detail below in conjunction with FIG. 13. The target area 16 from the individual apparatus faces the cylindrical surface of the bottle 12 to irradiate a UV curable ink thereon although it should be understood that the illustrated mechanism is not limited to a particular type of UV treatment such as curing of UV curable surface coatings. A rotating mechanism 406 drives a set of jaws 408 which hold the bottle for rotation while the individual bottles are disposed above the individual apparatus 10, 100 or 200 at the target area 16. The bottles are successively rotated through one or more steps which position a bottle for curing of a UV curable ink printed thereon at at least one of the circumferentially spaced apparatus 10, 100 or 200. At each location at which the bottle 16 is positioned for UV curing or other processes, the rotating system 406 rotates the bottle through at least a portion of one rotation so as to uniformly irradiate the at least one curved surface 14 of the bottle 12 with high peak irradiance to cure the surface coating thereon. If a substantial amount of UV curing is required, the bottles may be rotated through successive registrations with the circumferentially spaced apparatus 10, 100 or 200 or alternatively, may be rotated in groups such as four, when four spaced apart apparatus 10, 100 or 200 are used at which the entire curing operation uses only one stop at one light source at which rotation occurs for a sufficient time to complete the curing process. The time that the individual bottles 12 are located at the target area 16 of at least one of the apparatus 10, 100 or 200 is determined by the particular application. After a bottle rotates past the last apparatus 10, 100 or 200, as illustrated at approximately the "11:30" position, the bottle is removed from the holding mechanism. As indicated above, but not illustrated, to the right of "12:00" bottles are printed and automatically fed into engagement with the rotating and holding mechanism 408.

FIG. 13 illustrates an enlargement of a single station of the system 400 of FIG. 12. A set of jaws 408 engages the individual bottles 12 to provide secure holding and rotation while located in the target area 16. The opening from the apparatus 10, 100 or 200 into the target area 16 is adjusted to properly concentrate the converged first and second light beams to the size of the target area 16 so that the at least one surface 14 is irradiated. The opening is wider for the larger objects or objects which have for the at least one curved surface with a lesser radius of curvature making them flatter which lessens any requirement to precisely focus the light to produce substantially uniform high peak irradiance. While the invention has been described in terms of its preferred embodiments, it should be understood that numerous modifications may be made thereto without departing from the spirit and scope of the present invention. It is intended that all such modifications fall within the scope of the appended claims.

The invention claimed is:

1. An apparatus for providing substantially uniform irradiation of a three-dimensional object with at least one curved surface comprising:
    a source of light for providing light to irradiate the at least one curved surface of the three-dimensional object;
    a first curved light reflector, which reflects and converges light from the source into a first converged light beam;
    a second curved light reflector which reflects and converges the first converged light beam into a second converged light beam with the second light beam being redirected in direction relative to the first light beam toward a target area at which the three-dimensional object is positioned when being irradiated; and
    at least one light reflector, which extends from at least one of the first and second curved light reflectors, which reflects and concentrates the second light beam toward the target area at which the three-dimensional object is positioned when being irradiated.

2. An apparatus in accordance with claim 1 wherein:
    two light reflectors extend respectively from the first and second curved light reflectors which reflect and concentrate the second beam with ends of the two light reflectors remote from an attachment to the first and second curved light reflectors being disposed so as to define an opening at the remote ends through which the light passes toward the target area.

3. An apparatus in accordance with claim 2 wherein:
    the two light reflectors are respectively pivoted at the attachment to the first and second reflectors.

4. An apparatus in accordance with claim 3 wherein:
    the attachment of the two light reflectors to the first and second curved reflectors are separated by a distance, which is greater than a distance separating the remote ends of the two light reflectors, which define the opening.

5. An apparatus in accordance with claim 1 wherein:
    the first and second curved light reflectors define a light reflective trough;
    the first curved light reflector is in cross section a portion of a surface having at least one focus with a locus of one of the at least one focus defining a focal axis in the reflective trough with the source of light being spaced from and substantially parallel to the focal axis so that the light is directed to the target surface with substantial uniformity; and
    the second curved light reflector is in cross section a portion of a surface having at least one focus with the first curved light reflector being joined to the second curved light reflector.

6. An apparatus in accordance with claim 2 wherein:
    the first and second curved light reflectors define a light reflective trough;
    the first curved light reflector is in cross section a portion of a surface having at least one focus with a locus of one of the at least one focus defining a focal axis in the reflective trough with the source of light being spaced from and substantially parallel to the focal axis so that the light is directed to the target surface with substantial uniformity; and
    the second curved light reflector is in cross section a portion of a surface having at least one focus with the first curved light reflector being joined to the second curved light reflector.

7. An apparatus in accordance with claim 3 wherein:
    the first and second curved light reflectors define a light reflective trough;
    the first curved light reflector is in cross section a portion of a surface having at least one focus with a locus of one of the at least one focus defining a focal axis in the reflective trough with the source of light being spaced from and substantially parallel to the focal axis so that the light is directed to the target surface with substantial uniformity; and
    the second curved light reflector is in cross section a portion of a surface having at least one focus with the first curved light reflector being joined to the second curved light reflector.

8. An apparatus in accordance with claim 4 wherein:
    the first and second curved light reflectors define a light reflective trough;
    the first curved light reflector is in cross section a portion of a surface having at least one focus with a locus of one of the at least one focus defining a focal axis in the reflective trough with the source of light being spaced from and substantially parallel to the focal axis so that the light is directed to the target surface with substantial uniformity; and
    the second curved light reflector is in cross section a portion of a surface having at least one focus with the first curved light reflector being joined to the second curved light reflector.

9. An apparatus in accordance with claim 2 wherein:
    the first and second curved light reflectors define a light reflective trough, which is closed by light reflective, ends and the two light reflectors are planar.

10. An apparatus in accordance with claim 3 wherein:
the first and second curved light reflectors define a light reflective trough which is closed by light reflective ends and the two light reflectors are planar.

11. An apparatus in accordance with claim 4 wherein:
the first and second curved light reflectors define a light reflective trough, which is closed by light reflective, ends and the two light reflectors are planar.

12. An apparatus in accordance with claim 9 wherein:
the first and second curved light reflectors are joined together to define a line of inflection between the first and second curved light reflectors so that tangents to the curvature of the first and second curved light reflectors adjacent to the line of inflection extend in different directions and a third reflective planar surface is pivotally joined to an end of one of the first and second light reflective surface which is remote from the attachment to the first and second curved light reflectors which further concentrates the second beam toward the target area.

13. An apparatus in accordance with claim 10 wherein:
the first and second curved light reflectors are joined together to define a line of inflection between the first and second curved light reflectors so that tangents to the curvature of the first and second curved light reflectors adjacent to the line of inflection extend in different directions and a third reflective planar surface is pivotally joined to an end of one of the first and second light reflective surface which is remote from the attachment to the first and second curved light reflectors which further concentrates the second beam toward the target area.

14. An apparatus in accordance with claim 11 wherein:
the first and second curved light reflectors are joined together to define a line of inflection between the first and second curved light reflectors so that tangents to the curvature of the first and second curved light reflectors adjacent to the line of inflection extend in different directions and a third reflective planar surface is pivotally joined to an end of one of the first and second light reflective surface which is remote from the attachment to the first and second curved light reflectors which further concentrates the second beam toward the target area.

15. An apparatus in accordance with claim 1 comprising:
a conveying and rotating system which transports the three-dimensional object to the target area and rotates the object at the target area while light from the light source is directed to the target area; and wherein
the light source is a source of UV radiation.

16. An apparatus in accordance with claim 2 comprising:
a conveying and rotating system which transports the three-dimensional object to the target area and rotates the object at the target area while light from the light source is directed to the target area; and wherein
the light source is a source of UV radiation.

17. An apparatus in accordance with claim 3 comprising:
a conveying and rotating system which transports the three-dimensional object to the target area and rotates the object at the target area while light from the light source is directed to the target area; and wherein
the light source is a source of UV radiation.

18. An apparatus in accordance with claim 4 comprising:
a conveying and rotating system which transports the three-dimensional object to the target area and rotates the object at the target area while light from the light source is directed to the target area; and wherein
the light source is a source of UV radiation.

19. An apparatus in accordance with claim 5 comprising:
a conveying and rotating system which transports the three-dimensional object to the target area and rotates the object at the target area while light from the light source is directed to the target area; and wherein
the light source is a source of UV radiation.

20. An apparatus in accordance with claim 6 comprising:
a conveying and rotating system which transports the three-dimensional object to the target area and rotates the object at the target area while light from the light source is directed to the target area; and wherein
the light source is a source of UV radiation.

21. An apparatus in accordance with claim 7 comprising:
a conveying and rotating system which transports the three-dimensional object to the target area and rotates the object at the target area while light from the light source is directed to the target area; and wherein
the light source is a source of UV radiation.

22. An apparatus in accordance with claim 8 comprising:
a conveying and rotating system which transports the three-dimensional object to the target area and rotates the object at the target area while light from the light source is directed to the target area; and wherein
the light source is a source of UV radiation.

23. An apparatus in accordance with claim 9 comprising:
a conveying and rotating system which transports the three-dimensional object to the target area and rotates the object at the target area while light from the light source is directed to the target area; and wherein
the light source is a source of UV radiation.

24. An apparatus in accordance with claim 10 comprising:
a conveying and rotating system which transports the three-dimensional object to the target area and rotates the object at the target area while light from the light source is directed to the target area; and wherein
the light source is a source of UV radiation.

25. An apparatus in accordance with claim 11 comprising:
a conveying and rotating system which transports the three-dimensional object to the target area and rotates the object at the target area while light from the light source is directed to the target area; and wherein
the light source is a source of UV radiation.

26. An apparatus in accordance with claim 12 comprising:
a conveying and rotating system which transports the three-dimensional object to the target area and rotates the object at the target area while light from the light source is directed to the target area; and wherein
the light source is a source of UV radiation.

27. An apparatus in accordance with claim 13 comprising:
a conveying and rotating system which transports the three-dimensional object to the target area and rotates the object at the target area while light from the light source is directed to the target area; and wherein
the light source is a source of UV radiation.

28. An apparatus in accordance with claim 14 comprising:
a conveying and rotating system which transports the three-dimensional object to the target area and rotates the object at the target area while light from the light source is directed to the target area; and wherein
the light source is a source of UV radiation.

29. An apparatus in accordance with claim 9 wherein:
one of the first and second light reflectors is curved and another of the first and second reflectors is planar.

30. An apparatus in accordance with claim 10 wherein:
one of the first and second light reflectors is curved and another of the first and second reflectors are planar.

31. An apparatus in accordance with claim 11 wherein:
one of the first and second light reflectors is curved and another of the first and second reflectors are planar.

32. An apparatus in accordance with claim 2 wherein:
the first and second light reflectors are planar.

33. An apparatus in accordance with claim 3 wherein:
the first and second light reflectors are planar.

34. An apparatus in accordance with claim 4 wherein:
the first and second light reflectors are planar.

35. An apparatus in accordance with claim 5 wherein:
the first and second curved light reflectors are each a portion of an ellipse.

36. An apparatus in accordance with claim 6 wherein:
the first and second curved light reflectors are each a portion of an ellipse.

37. An apparatus in accordance with claim 7 wherein:
the first and second curved light reflectors are each a portion of an ellipse.

38. An apparatus in accordance with claim 8 wherein:
the first and second curved light reflectors are each a portion of an ellipse.

39. A method for providing substantially uniform irradiation of a three-dimensional object with at least one curved surface with an apparatus including a source of light for providing light, a first curved light reflector which reflects and converges light, a second curved light reflector which reflects and converges light, and at least one light reflector which extends from at least one of the first and second curved light reflectors which reflects and concentrates light comprising:
the source of light irradiating the first curved light reflector with light;
the first curved light reflector reflecting and converging the light from the source into a first converged light beam;
the second curved light reflector reflecting and converging the first converged light beam into a second converged light beam with the second light beam being redirected in direction relative to the first light beam toward a target area at which the three-dimensional object is positioned when being irradiated; and
the at least one light reflector reflects and concentrates the second light beam toward the target area at which the three-dimensional object is positioned when being irradiated.

40. A method in accordance with claim 39 wherein:
two light reflectors extend respectively from the first and second curved light reflectors which reflect and concentrate the second beam with ends of the two light reflectors remote from an attachment to the first and second curved light reflectors being disposed so as to define an opening at the remote ends through which the light passes toward the target area.

41. A method in accordance with claim 40 wherein:
the two light reflectors are respectively pivoted at the attachment to the first and second reflectors.

42. A method in accordance with claim 39 wherein:
the first and second curved light reflectors define a light reflective trough;
the first curved light reflector is in cross section a portion of a surface having at least one focus with a locus of one of the at least one focus defining a focal axis in the reflective trough with the source of light being spaced from and substantially parallel to the focal axis so that the light is directed to the target surface with substantial uniformity; and
the second curved light reflector is in cross section a portion of a surface having at least one focus with the first curved light reflector being joined to the second curved light reflector.

43. A method in accordance with claim 40 wherein:
the first and second curved light reflectors define a light reflective trough, which is closed by light reflective, ends and the two light reflectors are planar.

44. A method in accordance with claim 43 wherein:
the first and second curved light reflectors are joined together to define a line of inflection between the first and second curved light reflectors so that tangents to the curvature of the first and second curved light reflectors adjacent to the line of inflection extend in different directions and a third reflective planar surface is pivotally joined to an end of one of the first and second light reflective surface which is remote from the attachment to the first and second curved light reflectors which further concentrates the second beam toward the target area.

45. A method in accordance with claim 39 wherein:
a conveying and rotating system transports the three-dimensional object to the target area and rotates the object at the target area while light from the light source is directed to the target area; and
the light source is a source of UV radiation.

46. A method in accordance with claim 40 wherein:
one of the first and second light reflectors is curved and another of the first and second reflectors are planar.

47. A method in accordance with claim 40 wherein:
the first and second light reflectors are planar.

48. A method in accordance with claim 42 wherein:
the first and second curved light reflectors are each a portion of an ellipse.

49. A system for providing substantially uniform irradiation of a three-dimensional object with at least one curved surface comprising:
first and second spaced apart apparatus for providing substantially uniform radiation of the three-dimensional object with at least one curved surface which face the three-dimensional object from different positions; and wherein
the first and second apparatus each comprise a source of light for providing light to irradiate the at least one curved surface of the three-dimensional object; a first curved light reflector which reflects and converges light from the source into a first converged light beam, a second curved light reflector which reflects and converges the first converged light beam into a second converged light beam with the second light beam being redirected in direction relative to the first light beam toward a target area at which the three-dimensional object is positioned when being irradiated, and at least one light reflector which extends from at least one of the first and second curved light reflectors which reflects and concentrates the second light beam toward the target area at which the three-dimensional object is positioned when being irradiated.

50. A system in accordance with claim 49 wherein:
the first and second apparatus are opposed to and irradiate opposed portions of the at least one surface.

* * * * *